Patented Apr. 10, 1945

2,373,295

UNITED STATES PATENT OFFICE 2,373,295

CONVERSION OF PARAFFIN HYDROCARBONS

Paul L. Cramer, Highland Park, and Charles R. Begeman, Grosse Pointe Woods, Mich., assignors to General Motors Corporation, Detroit, Mich., a corporation of Delaware No Drawing. Application August 16, 1943, Serial No. 498,866

8 Claims. (Cl. 260—683.5)

This invention has to do with the conversion of paraffin hydrocarbons.

It has been proposed heretofore to react aluminum halide with paraffin hydrocarbons in the presence of a halogen acid as a promoter. The two important reactions of aluminum halides with paraffin hydrocarbons containing more than four carbon atoms are as follows: (1) the isomerization of straight-chain paraffins to highly branched isomers, and (2) the cracking of such paraffins to isobutane as an end product. In the modern scheme of synthetic high-octane fuels both reactions are important. However, to obtain the most highly branched paraffins in reasonable yields, low reaction temperatures are required. At room temperature the reaction of aluminum halides with paraffins, using the usual promoting agents such as halogen acids, is too slow for practical purposes. The primary object of the invention herein is to provide a process of converting paraffins wherein the reaction rate is increased greatly as compared with prior practices, and particularly to provide an improved process of converting straight chain paraffins having four or more carbon atoms in the molecule to branched chain paraffins.

We have discovered that the aluminum alcoholates, aluminum compounds of aliphatic alcohols, are active promoters for the aluminum chloride-paraffin reaction. These compounds are several-fold more active than water or hydrochloric acid, promoters now used in practice, in promoting the aluminum chloride-paraffin reaction. Typical aluminum alcoholates which may be employed as promoters are: aluminum ethoxide, aluminum isopropoxide, and aluminum tert-butoxide.

The aluminum alcoholates as promoters are employed in concentrations on the order of 0.2 to 3 mole per cent. The preferred concentrations are as follows: aluminum alcoholate, 1 mol %; aluminum chloride, 11 mole %; paraffin hydrocarbon, 88 mol %.

Ordinarily the reaction temperature will be within the range of 0° C. up to the boiling point of the hydrocarbon to be converted. Temperatures considerably lower may be used as may also higher temperatures under some conditions. With low temperature conditions the speed of reaction is reduced. In order to obtain greater yields of the more highly branched paraffin isomers, it is desirable to carry out the reaction at relatively low temperature.

As specific and representative illustrations of procedure the following examples are given:

Example I

The following amounts of materials were allowed to react in an autoclave for 3.5 days at +5° C. with stirring: n-hexane, 1500 cc.; aluminum chloride, 200 g.; aluminum isopropoxide, 30 g. Forty-five per cent of the n-hexane was converted to branched chain paraffins, which had the following percentage composition as determined by fractionation:

| | Per cent |
|---|---|
| Isobutane | 20.2 |
| Isopentane | 12.9 |
| 2,2-dimethylbutane | 12.9 |
| 2,3-dimethylbutane | 8.0 |
| 2-methlypentane | 21.3 |
| 3-methylpentane | 7.9 |
| Higher boiling paraffins | 16.8 |

Example II

The following amounts of materials were allowed to react in an autoclave for 2 days at +5° C. with stirring: n-heptane, 1700 cc; aluminum chloride, 200 g.; aluminum tert-butoxide, 36 g. Thirty-four per cent of the n-heptane was converted to branched chain paraffins, which had the following percentage composition as determined by fractionation:

| | Per cent |
|---|---|
| Isobutane | 17.4 |
| Isopentane | 14.0 |
| 2,2-dimethylbutane | 2.7 |
| 2,3-dimethylbutane | |
| 2-methylpentane | 10.0 |
| 3-methylpentane | |
| 2,2-dimethylpentane | |
| 2,4-dimethylpentane | 13.8 |
| 2,2,3-trimethylbutane | |
| 2-methylhexane | |
| 3-methylhexane | 27.6 |
| 2,3-dimethylpentane | |
| 3,3-dimethylpentane | |
| Higher boiling paraffins | 14.5 |

In comparison with the results given in Examples I and II, no reaction occurred with n-hexane and n-heptane, and aluminum chloride when stirred for one week at —5° C. to +10° C. using water and hydrochloric acid rather than aluminum alcoholates as promoters.

In a manner generally similar to treatment of n-hexane and n-heptane, other paraffin hydrocarbons and in particular straight chain paraffin hydrocarbons having four or more carbon atoms in the molecule may be converted. Mixtures of the paraffin hydrocarbons may be treated in similar manner. Other aluminum halides such as aluminum bromide may be used in place of aluminum chloride. It is contemplated also that mixtures of the aluminum alcoholates may be used as the promoter, if desired.

Various modifications and changes may be made without departing from the principles and spirit of our invention.

We claim:

1. The process of converting a paraffin hydrocarbon to other paraffinic hydrocarbons which includes, treating the paraffin hydrocarbon with an aluminum halide in the presence of an aluminum alcoholate as a promoter.

2. The process of converting a straight-chain paraffin hydrocarbon to branched chain paraffinic hydrocarbons which includes, reacting said straight-chain hydrocarbon with an aluminum halide in the presence of an aluminum alcoholate as a promoter.

3. The process of converting a straight-chain paraffinic hydrocarbon having at least four carbon atoms in the molecule to branched chain paraffinic hydrocarbons which includes, reacting the straight-chain paraffinic hydrocarbon with an aluminum halide in the presence of an aluminum alcoholate as a promoter, said promoter being about 0.2 to 3 mole per cent.

4. A process as in claim 3 in which the hydrocarbon is n-hexane.

5. A process as in claim 3 in which the hydrocarbon is n-heptane.

6. A process as in claim 3 in which the aluminum halide is aluminum chloride, the aluminum alcoholate is aluminum isopropoxide, the hydrocarbon is n-hexane, and a reaction temperature of 5° C. is employed.

7. A process as in claim 3 in which the aluminum halide is aluminum chloride, the aluminum alcoholate is aluminum tert-butoxide, the hydrocarbon is n-heptane, and a reaction temperature of 5° C. is employed.

8. The process of converting a straight-chain paraffin hydrocarbon having at least four carbon atoms in the molecule to branched chain paraffinic hydrocarbons which includes, forming a mixture composed substantially as follows: straight chain paraffin, 88 mole %; aluminum halide, 11 mole %; and aluminum alcoholate, 1 mole %; and stirring said mixture while it is in an autoclave until the straight chain paraffin is substantially converted to branched chain paraffins.

PAUL L. CRAMER.
CHARLES R. BEGEMAN.